Aug. 8, 1961　　　　　　　M. FILL　　　　　　　2,994,908
HEAD PULLER FOR HOGS AND THE LIKE
Filed Sept. 8, 1959　　　　　　　　　　　　　　3 Sheets-Sheet 1

INVENTOR.
METRO FILL

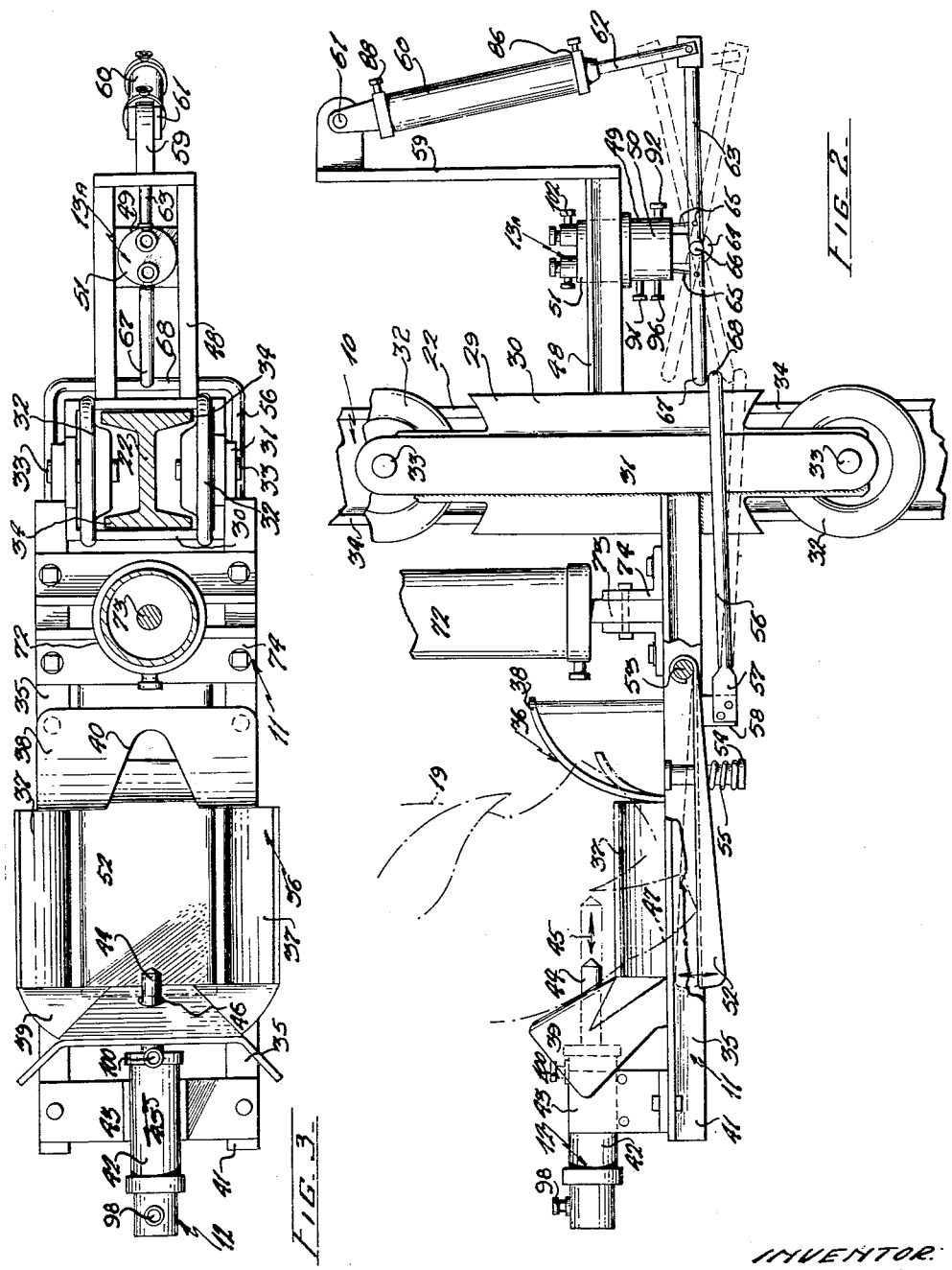

Aug. 8, 1961    M. FILL    2,994,908
HEAD PULLER FOR HOGS AND THE LIKE
Filed Sept. 8, 1959    3 Sheets-Sheet 3

INVENTOR:
METRO FILL

United States Patent Office 2,994,908
Patented Aug. 8, 1961

2,994,908
HEAD PULLER FOR HOGS AND THE LIKE
Metro Fill, Winnipeg, Manitoba, Canada, assignor to Canada Packers Limited, Toronto, Ontario, Canada
Filed Sept. 8, 1959, Ser. No. 838,555
14 Claims. (Cl. 17—1)

My invention relates to new and useful improvements in head pullers for the processing of hogs upon a moving conveyor rail.

Hogs being processed on a continuously moving overhead conveyor rail, are normally suspended by the hind legs thereof so that the various processing operations can be carried out progressively as the hogs pass various stages along the conveyor line.

At one point during the processing of the hogs, it is necessary to break the joint connecting the head to the spine, commonly known as the neck joint, so that the head can then be removed from the carcass which then continues along the conveyor rail.

This is conventionally accomplished by cutting through the flesh and skin from the underside of the neck to around the rear thereof adjacent the neck joint whereupon it is necessary for the operator to grasp the hog by the snout and jerk the head upwardly towards the back so that the neck joint may be broken whereupon further cutting with the knife will separate the head from the carcass.

This operation suffers from several disadvantages. Firstly, the operator cutting the skin and flesh towards the neck joint has to guess the position of the neck joint and a slight error in the direction of the cut often means that surplus flesh is left upon the head of the animal.

As the processing of the head results in a lower price per pound being obtained from any flesh thereon, it will be apparent that a small error in the cutting, multiplied by several thousand hogs, will amount to a considerable loss of revenue for the processors.

Secondly, and most important, it requires considerable manual effort for the operator to break the neck due to lack of leverage and the like, particularly when working on hogs of some considerable weight and when a relatively large number of hogs is processed in one day, such an operation can be extremely fatiguing as well as slowing down the speed of processing.

By providing a vertically reciprocating pulling component mounted adjacent the overhead rail, I have overcome both of these serious disadvantages resulting in a more economical processing of the hog and a less fatiguing condition for the operator.

These advantages are obtained by utilizing a pulling component movable vertically upon supporting structure and including means adapted to engage through the lower jaw of the hog mounted upon said pulling component. By suitable valving and synchronization of the device with the moving rail, the device automatically positions itself around the head of the hog, engages the lower jaw thereof, and then moves downwardly thus separating the head from the spine at the neck joint whereupon the gripping device is automatically disengaged from the hog which then moves onwardly for further processing.

The principal object and essence of my invention is, therefore, to provide a device adapted automatically to engage the head of the hogs being processed, and then to pull same downwardly thus separating the head from the carcass at the neck joint.

Another object of my invention is to provide a device of the character herewithin described which automatically positions itself irrespective of size of the hog being processed.

Yet another object of my invention is to provide a device of the character herewithin described which is particularly suitable for use with a source of pneumatic power, but which readily can be adapted to be operated hydraulically if desired.

A still further object of my invention is to provide a device of the character herewithin described which is adapted to pivot around the vertical axis thereof thus permitting the head to be separated from the carcass without the necessity of stopping the overhead conveyor.

Still another object of my invention is to provide a device of the character herewithin described which is adapted to speed up the processing of the hogs and which is also adapted to reduce the fatigue of the operator.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 2 is an enlarged fragmentary side elevation of the pulling component per se.

FIGURE 3 is a top plan view of FIGURE 2.

In the drawings like characters of reference indicate corresponding parts in the different figures.

Figure 1:
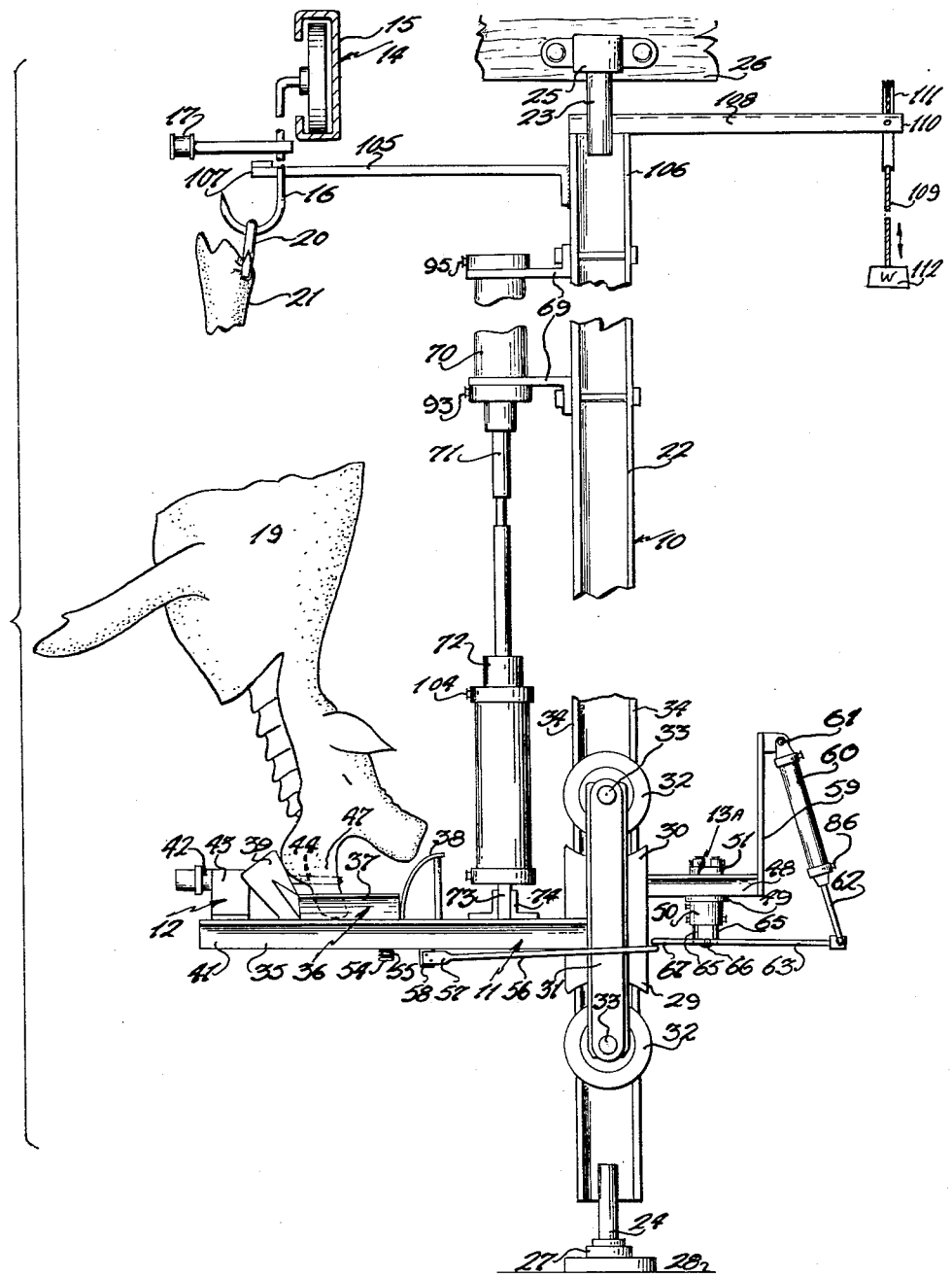
FIGURE 1 is a side elevation of my device showing the head gripping component engaged within the lower jaw of the hog being processed.

My invention consists essentially of the following principal components. Vertical support means collectively designated 10, a pulling component collectively designated 11, a head gripping component mounted on the pulling component and collectively designated 12 and valving means collectively designated 13A and 13B, the latter being the control means associated with the conventional overhead carcass conveying rail collectively designated 14.

It will be appreciated, as hereinafter to be described, that the valving means is operated by a source of fluid pressure (not illustrated) which, in this instance, is assumed to be compressed air, but which of course could be hydraulic fluid if desired.

In detail, reference should be made to the drawings which show a conventional carcass carrying rail 15 which carries a plurality of carcass carrying hooks 16 maintained in spaced and apart relationship upon the rail 15 due to their engagement with a conveyor chain 17 carried by sprockets, one of which is shown at 18, all of which is conventional.

The hog carcasses 19 are suspended from the hooks 16 by means of a spreader 20 which in turn engages the shank 21 of the hind legs of the hog thus preventing the hogs from rotating during the move along the rail.

Adjacent the rails 14, I have provided the vertical support means 10 which consists of an I-beam 22 mounted for rotation around the vertical axis thereof, upon spindles 23 and 24 secured to the I-beam and extending therefrom. The upper spindle 23 is journalled within a bearing 25 mounted upon a convenient support member 26 and the lower spindle 24 is mounted within a bearing 27 supported, in this instance upon ground level 28. The partial rotation of the vertical support means 10 upon spindles 23 and 24 is desirable so that the device can swing around during the time the head is being pulled thus permitting the operation to be carried out without stopping the movement of the carcass carrying rail 14.

The pulling component 11 consists of a trolley 29 which in turn consists of a box-like structure 30 freely surrounding the I-beam 22 and including vertical straps 31 upon each side thereof within the ends of which are journalled for rotation, sheaves or wheels 32 mounted upon axles 33. These sheaves engage the flanges 34 of the I-beam and permit the trolley and the pulling component to be moved vertically up and down the vertical support means 10.

Supporting structure taking the form of a pair of angle arms 35 are secured to the trolley 29 and extend outwardly at right angles thereto towards the carcass carrying rail 14 and mounted upon these angle irons are hog head guiding means collectively designated 36. These guiding means, manufactured preferably from stainless steel sheets, include outwardly curving side guides 37, a snout guide 38 which spans the angle irons 35, and an outer guide plate 39 also spanning the angle irons thus making an open base chute as clearly shown in FIGURES 2 and 3. It will be noted that the snout guide 38 is provided with a V-shaped cut-out 40 to facilitate accurate positioning of the head with relation to the pulling component, the purpose of which will hereinafter become apparent.

Mounted upon the outboard ends 41 of the angle irons 35, is the aforementioned head gripping component or assembly 12, which consists of a pneumatic cylinder 42 held by means of bracket 43 and having a piston (not illustrated) reciprocal in a horizontal plane within the cylinder. A rod 44 is connected to the piston and is adapted to be moved in the direction of the double-headed arrow 45. This bolt or rod passes through an aperture 46 within the guide plate 39 of said guide means and is adapted to engage through the lower jaw 47 of the hog being processed.

From the foregoing it will be appreciated that with the bolt 44 engaging the jaw 47, movement of the pulling component downwardly, will cause the head to be pulled with reference to the carcass thus breaking the neck joint connecting the head to the carcass.

Means are provided automatically to position the pulling component 11 with relation to the head of the carcass, to engage the bolt 44 through the lower jaw of the carcass, to lower the pulling assembly thus breaking the neck point, to retract the bolt 44 thus disengaging the carcass, and to return the pulling component to its uppermost position ready to receive the head of the next carcass upon the rail, all of which are controlled by the aforementioned valving means 13A and 13B.

A bracket 48 extends rearwardly from the trolley 29 and carries a multiple valve assembly 49 which consists of a lower portion 50 mechanically operated, and an upper portion 51 operated by a servo-piston internally. However, as details of construction of this valve are conventional, these are not being given in the specification.

Dealing first with the mechanically operated portion 50 of this multiple valve 49, reference should be made to FIG. 2 in which I have shown a treadle or flat plate 52 pivoted upon the rod 53 spanning the angle irons 35 and extending under the open head guiding means hereinbefore described. A pin 54 extends downwardly from the supports 35 and carries a spring 55 engaging the upper side of the treadle thus normally maintaining it in the uppermost position as shown in FIGURE 2. However, when the pulling component moves upwardly to engage the head of the hog, the lower jaw contacts this treadle 52 thus depressing it against the pressure of spring 55 and actuating the valve 49 in a manner to stop the upward movement of the pulling component.

The actuation of the portion 50 of the valve 49 is occasioned by a stirrup 56 extending around the trolley 29 and the I-beam 22 and being secured by the ends 57 thereof to downwardly depending lugs 58 in turn secured to the under side of the treadle 52 just forwardly of the pivot 53.

Referring to the bracket 48 hereinbefore described, an upwardly extending portion 59 carries a pneumatic cylinder 60 by means of pivot 61, the piston rod 62 of which is pivotally connected to a valve actuating bar 63. This bar 63 is pivoted intermediate the ends thereof upon a lug 64 depending from the valve 49 and valve actuating levers 65 extend from the under side of the valve 49 to be pivotally secured to the lever upon each side of the central pivot 66. The forward end 67 of the lever 63 extends towards the trolley 29 and is adapted to be engaged by the rear loop 68 of the aforementioned stirrup 56.

This lower portion 50 of the valve 49 routes compressed air to various cylinders as will hereinafter be described, but at this point it is desired to stress that when the bar 63 is in the substantially horizontal position shown in FIGURE 2, then this portion of the valve is in neutral with the lines locked and that this bar is positioned in the neutral position when the lower jaw of the hog strikes the treadle 52 moving it downwardly thus moving the loop 68 of the stirrup upwardly. Furthermore, the cylinder 60 controls the operating position of arm 63 moving the end 67 either to the lowermost position shown in phantom or to the uppermost position shown in phantom.

Mounted adjacent the upper end of the I-beam 22 by means of brackets 69 is a pulling component positioning piston and cylinder assembly 70 and having a piston rod 71 extending downwardly therefrom to be connected by the lower ends thereof to the upper end of a further cylinder 72. This cylinder 72 contains a piston with a piston rod 73 extending downwardly therefrom to be connected to bracket 74 spanning the aforementioned angle irons 35 of the pulling component.

The last-mentioned cylinder 72 and piston rod 73 control the downward movement of the pulling component during the neck-breaking operation whereas the positioning cylinder 70 and its rod 71 control the initial movement of the pulling component when engaging the head of the associated hog.

Figure 4:
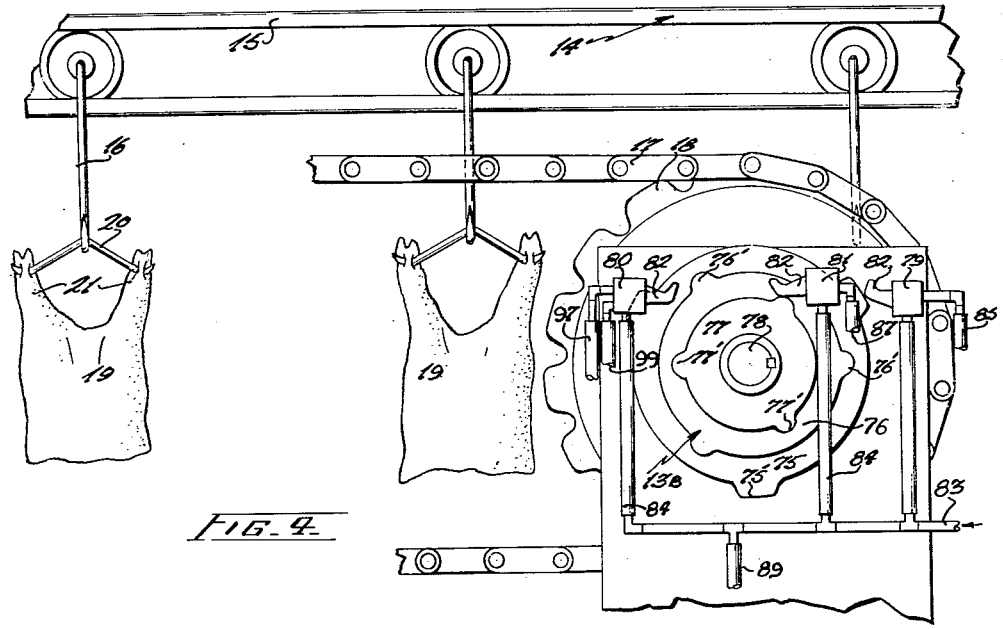
FIGURE 4 is a side elevation of part of the overhead conveyor showing the portion of the valve control means for the operation of the device.
Figure 5:
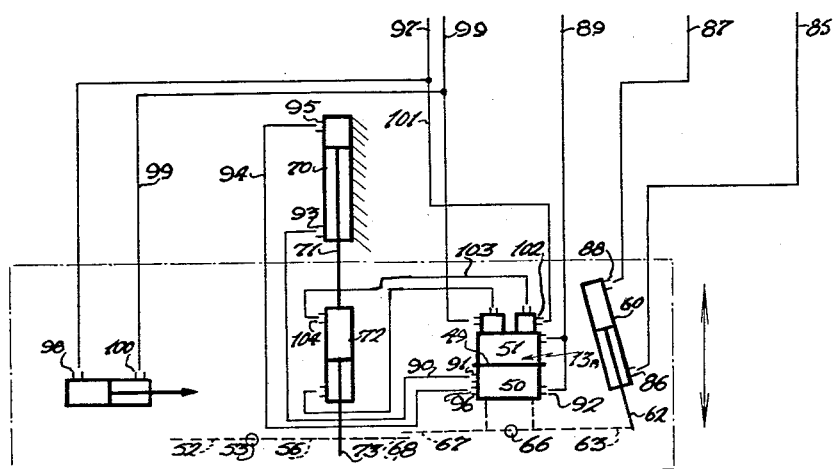
FIGURE 5 is a schematic diagram of the valving system and routing of the pneumatic air lines.

All of these operations are synchronized by the valving means 13B and in this connection reference should be made to FIGURES 4 and 5 of the accompanying drawings.

Mounted upon a convenient sprocket 18 controlled by the movement of the chain 17, is a multiple cam assembly consisting of three cams 75, 76 and 77. These three cams are keyed to the spindle 78 of the sprocket 18 and rotate therewith.

Each of these cams is provided with lobes 75', 76' and 77' respectively and these lobes are adapted to operate pneumatic air valves 79, 80 and 81 respectively. Each of the valves includes an actuating arm 82 adapted to be struck by the corresponding lobes of the cams as they rotate.

A source of compressed air (no illustrated) is fed through the main conduit 83 to branch conduits 84 leading to the valves 79, 80 and 81, and it will be appreciated that the position of the lobes of the cams are synchronized with relation to the position of the hogs upon the rail.

Dealing first with valve 79, a conduit 85 extends from this valve to the lower end 86 of the cylinder 60, and a conduit 87 extends from valve 81 to the upper end 88 of the cylinder 60. From the foregoing, it will be appreciated that by routing compressed air through conduit 85, piston rod 62 will be retracted whereas by routing compressed air through conduit 87, the piston rod 62 will be extended, it being understood that when valve 79 is feeding compressed air through conduit 85, valve 81 is open so that air can exhaust through conduit 87 and vice versa.

This piston and cylinder assembly 60, which is classified as a pilot valve, operates the aforementioned lever or bar 64 hereinbefore described.

When the piston rod 62 is retracted by means of the operation of valve 79, the lower portion 50 of the valve 49 is operated so that a source of compressed air passing through conduit 89 extending to conduit 83, is connected to a conduit 90 extending from valve 49 at 91. In this connection it should be pointed out that conduit 89 enters valve 49 at 92. Conduit 90 extends to the lower end connection 93 of the positioning cylinder 70 thus forcing the piston upwardly therein and raising the pulling component 11 upwardly along the I-beam 22. In this connection, conduit 94 extending between the upper end connection 95 of the positioning cylinder and the connection 96 within the valve 49, acts as an exhaust conduit in the conventional manner.

The pulling component continues to rise until the lower jaw 47 of the associated hog strikes the treadle 52 as hereinbefore described, tripping the lever 63 to the neutral position shown in full line in FIGURE 2, which neutral position has the effect of locking the positioning piston within its cylinder so that it cannot move in either direction.

All of the operations just described are initiated by the respective lobes 75' of the cam 75 striking the lever 82 of the valve 79.

At this point, one of the lobes 76' of the cam 76 strikes the lever 82 of valve 80. The actuating of lever 82 of the valve 80 permits compressed air from line 84 to pass through conduit 97 which is connected to the rear end connection 98 of the head gripper cylinder 42 thus forcing the piston rightwardly with reference to the drawing and extending bolt 44 to engage within the lower jaw 47 of the associated hog as hereinbefore described. Conduit 99, which extends from the front end connection 100 of the cylinder 42 permits air to be exhausted in front of the piston in the conventional manner, it being observed that conduit 99 is connected to valve 80. At the same time as air is fed through conduit 97, air is also fed through branch conduit 101 into the upper portion 51 of the valve 49 at point 102. This operates the servo-mechanism within the valve thus giving a slight delay and then permits air to be fed through conduit 103 to the upper end connection 104 of cylinder 72. This forces the piston rod 73 downwardly together with the pulling component 11 thus extending the neck and breaking the joint between the head and the spinal column, it being appreciated that piston rod 71 is locked immovably at this time.

When the pulling component has moved downwardly to break the neck joint, cam lobe 77' strikes the lever 82 of valve 81 thus passing compressed air through conduit 87 to the upper end connection 88 of the pilot cylinder 60. This extends rod 62 and operates valve 49 thus reversing the air flow through the positioning cylinder 70 and lowering the entire pulling component to the lowermost position ready to receive the next hog.

It will be appreciated that by the time cam lobes 77' strike the operating lever 82 of valve 81, cam lobe 76' has passed over its operating lever thus releasing valve 80 and reversing the flow of air through the conduit so that the rod 44 is caused to retract and to remain in this position until valve 80 is once again operated by the next successive cam lobe. This reversal, therefore, also causes a reversal of flow in cylinder 72 thus causing piston rod 73 to retract so that the pulling component 11 takes up the position with reference to cylinder 72 as shown in FIGURES 1 and 2.

By positioning the cams and timing the position of the lobes on the cam rings, the various operations are synchronized with the position of the hog travelling along the rail so that the positioning cylinder commences to raise the pulling component as soon as a hog is in position.

In order to permit the head pulling operation to be carried out without stopping the conveyor, it is necessary to have the device mounted to pivot on a vertical axis as hereinbefore described and in this connection I have provided a hog follower consisting of a lever 105 secured to the upper end 106 of the I-beam and extending outwardly at right angles therefrom and adapted to be engaged by the carcass carrying hook 16 as it passes through the assembly. It will be noted from FIGURE 1 that the hook engages the lever 105 adjacent the outer ends 107 thereof so that as the hooks travel past, it causes the assembly to pivot on the spigots 23 and 24 until such time as the assembly slides over the end 107 of the lever.

It is necessary, of course, to return the device so that the pulling component 11 is at right angles to the run of the conveyor and I therefore provide a return lever 108 secured to the I-beam and extending rearwardly of lever 105. A cable 109 is secured by one end thereof to the extremity 110 of the arm 108, said cable passing over a sheave or pulley 111 and terminating in a tensioning device such as a weight 112.

It will, therefore, be appreciated that when the device is pivoted by the engagement of the hooks with the lever 105, the weight is moved upwardly thus storing energy which acts to return the device to the original position as soon as the hook disengages from lever 105.

In conclusion, and in order to clarify the operation of the device, the following sequence occurs as a hog reaches the head pulling station. At this time the pulling component 11 is in its lowermost position and as the head of the hog reaches the assembly, valve 79 is tripped thus operating valve 49 which in turn operates the positioning cylinder 70 and raises the pulling assembly so that the head of the hog is engaged by the head guide 36. As soon as the lower jaw 47 strikes the treadle 52, the positioning cylinder is locked in the neutral position and valve 80 is tripped thus extending the bolt 44 to engage the lower jaw and causing the piston rod 73 to be extended from cylinder 72 thus lowering the pulling assembly and breaking the neck joint. At this point, valve 80 becomes disengaged from its cam lobe thus reversing the air flow and retracting bolt 44 and retracting piston rod 73 within cylinder 72.

At the same time valve 81 is operated thus unlocking the positioning cylinder and reversing the air flow in the valve 50 so that the pulling component 11 moves to its lowermost position to await the next carcass on the rail.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A head rail puller for hogs and the like suspended by the hind legs thereof from a conventional overhead processing conveyor rail, comprising in combination a source of fluid power, a pulling component, means adjacent said rail for mounting said pulling component for vertical movement thereon, head gripping means on said pulling component for selectively gripping the head of the associated hog, and means operatively connected between said source of power and said pulling component for moving said pulling component vertically on said first mentioned means.

2. A device for pulling the heads of hogs and the like to separate the head from the spine at the neck joint; comprising in combination a source of fluid power, vertical support means adjacent the conventional carcass carrying conveyor rail from which the hog is suspended via the hind legs thereof, a pulling component mounted for vertical movement on said support means, gripper means on said pulling component adapted to engage the head of the hog, fluid pressure valve means operatively connected between said source of fluid pressure and said device, adapted to move said pulling component vertically and to engage and disengage said gripper means with the head of the associated hog.

3. The device according to claim 2 which includes means operatively connected between said carcass carrying conveyor rail and said valve means adapted to synchronize the operation of said valving means with the position of the associated carcass upon the rail.

4. The device according to claim 2 in which said pulling component includes a trolley mounted for vertical movement on said support means, supporting structure extending outwardly from said trolley and towards the associated conveyor rail, and hog head guiding means mounted on said supporting structure, said gripper means being mounted on said supporting structure and adapted to engage and disengage through the lower jaw of the associated hog.

5. The device according to claim 2 which includes a fluid presure operated vertically positioning piston and cylinder assembly on said vertical support structure, operatively connected to said pulling component and being operatively connected to said valving means.

6. The device according to claim 2 in which said vertical support means is mounted for limited rotational motion around the longitudinal axis thereof, and means extending therefrom engageable with said carcass carrying conveyor and adapted to maintain the relationship between the associated hog and said pulling component during the operation of the device.

7. The device according to claim 3 in which said pulling component includes a trolley mounted for vertical movement on said support means, supporting structure extending outwardly from said trolley and towards the associated conveyor rail, and hog head guiding means mounted on said supporting structure, said gripper means being mounted on said supporting structure and adapted to engage and disengage through the lower jaw of the associated hog.

8. The device according to claim 3 which includes a fluid pressure operated vertical positioning piston and cylinder assembly on said vertical support structure, operatively connected to said pulling component and being operatively connected to said valving means.

9. The device according to claim 4 which includes a fluid pressure operated vertical positioning piston and cylinder assembly on said vertical support structure, operatively connected to said pulling component and being operatively connected to said valving means.

10. The device according to claim 7 which includes a fluid pressure operated vertical positioning piston and cylinder assembly on said vertical support structure, operatively connected to said pulling component and being operatively connected to said valving means.

11. The device according to claim 5 in which said pulling component also includes a piston and cylinder assembly extending between said positioning piston and cylinder assembly and said pulling component, and being operatively connected to said valving means and adapted to move said pulling component vertically on said vertical support means.

12. The device according to claim 9 in which said pulling component also includes means on the underside thereof engageable by the snout of the associated hog, and being operatively connected to said valving means and adapted to control the movement of said positioning cylinder.

13. The device according to claim 6 in which said pulling component also includes means on the underside thereof engageable by the snout of the associated hog, and being operatively connected to said valving means and adapted to control the movement of said positioning cylinder.

14. The device according to claim 6 in which said pulling component also includes a piston and cylinder assembly extending between said positioning piston and cylinder assembly and said pulling component, and being operatively connected to said valving means and adapted to move said pulling component vertically on said vertical support means.

References Cited in the file of this patent

UNITED STATES PATENTS

| | | |
|---|---|---|
| 1,699,695 | Feister | Jan. 22, 1929 |
| 2,436,629 | Carlsen | Feb. 24, 1948 |
| 2,634,457 | Moyer et al. | Apr. 14, 1953 |
| 2,789,310 | Soss | Apr. 23, 1957 |